United States Patent
Alfraih et al.

(10) Patent No.: US 12,015,522 B2
(45) Date of Patent: Jun. 18, 2024

(54) SYSTEMS AND METHODS FOR DETECTING SYSTEM CONFIGURATION CHANGES

(71) Applicant: SAUDI ARABIAN OIL COMPANY, Dhahran (SA)

(72) Inventors: Mohammed Adel Alfraih, Khobar (SA); Sultan Saadaldean Alsharif, Khobar (SA); John Gwilliams, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 17/820,113

(22) Filed: Aug. 16, 2022

(65) Prior Publication Data
US 2024/0064060 A1   Feb. 22, 2024

(51) Int. Cl.
*H04L 41/0816*   (2022.01)
*H04L 9/40*   (2022.01)
*H04L 41/08*   (2022.01)

(52) U.S. Cl.
CPC ...... *H04L 41/0816* (2013.01); *H04L 41/0883* (2013.01); *H04L 63/1416* (2013.01); *H04L 63/1425* (2013.01)

(58) Field of Classification Search
CPC ............. H04L 41/0816; H04L 41/0883; H04L 63/1416; H04L 63/1425
See application file for complete search history.

(56) References Cited

U.S. PATENT DOCUMENTS

| | | | | |
|---|---|---|---|---|
| 2011/0302652 | A1* | 12/2011 | Westerfeld | H04L 43/10 726/22 |
| 2016/0234094 | A1* | 8/2016 | Balabine | H04L 67/02 |
| 2019/0166020 | A1* | 5/2019 | Mommileti | H04L 43/12 |
| 2021/0352087 | A1* | 11/2021 | Ryver | G06N 10/00 |
| 2023/0199004 | A1* | 6/2023 | Texada | H04L 63/1433 726/22 |

OTHER PUBLICATIONS

Taps vs. SPA. (Sep. 2015). ixiacom.com. https://support.ixiacom.com/sites/default/files/resources/whitepaper/915-3534-01-tap-vs-span-ltr.pdf.

* cited by examiner

*Primary Examiner* — Thomas J Dailey
(74) *Attorney, Agent, or Firm* — Vorys, Sater, Seymour and Pease LLP

(57) ABSTRACT

The present disclosure relates to systems and methods for detecting unauthorized system configuration changes. For example, metadata can be extracted from network traffic captured by one or more different network tools and/or network devices and provided to a metadata evaluator. As an example, the one or more different network tools and/or devices can include a switch port analyzer tool, a security information and event management tool, and/or a test access port device. The metadata evaluator can process the extracted metadata to detect a system configuration change in a system on a network that includes the network traffic. The metadata evaluator can determine whether the system configuration change is an authorized system configuration change. In some examples, the metadata evaluator can determine whether the system configuration change is an authorized system configuration change based on change management data from a change management system.

10 Claims, 6 Drawing Sheets

SYSTEMS AND METHODS FOR DETECTING SYSTEM CONFIGURATION CHANGES

FIELD OF THE DISCLOSURE

This disclosure relates generally to network monitoring, and more particularly, to systems and methods for detecting system configuration changes.

BACKGROUND OF THE DISCLOSURE

Network monitoring refers to monitoring activities occurring on a network for problems related to performance, misbehaving hosts, suspicious user activity, intruder detection, and/or malware.

SUMMARY OF THE DISCLOSURE

Various details of the present disclosure are hereinafter summarized to provide a basic understanding. This summary is not an exhaustive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

According to an embodiment consistent with the present disclosure, a method can include extracting metadata from network traffic, providing the extracted metadata to a metadata evaluator, processing using the metadata evaluator the extracted metadata to detect a system configuration change in a system on a network that includes the network traffic, and determining using the metadata evaluator whether the system configuration change is an authorized system configuration change.

In another embodiment consistent with the present disclosure, a system can include memory to store machine-readable instructions, and one or more processors to access the memory and execute the machine-readable instructions. The machine-readable instructions can include a network aggregator that can aggregate network traffic, and extract metadata from the aggregated network traffic. The machine-readable instructions can further include a metadata evaluator that can detect a system configuration change in a system on a network that includes the network traffic based on the extracted metadata, and determine whether the system configuration change is an authorized system configuration change based on change management data. The change management data can indicate whether the system configuration change is an authorized system configuration change.

Any combinations of the various embodiments and implementations disclosed herein can be used in a further embodiment, consistent with the disclosure. These and other aspects and features are better appreciated according to the following description of certain embodiments presented herein in accordance with the disclosure and the accompanying drawings and claims.

DETAILED DESCRIPTION

Embodiments of the present disclosure will now be described in detail with reference to the accompanying Figures. Further, in the following detailed description of embodiments of the present disclosure, numerous specific details are set forth in order to provide a more thorough understanding of the claimed subject matter. However, it will be apparent to one of ordinary skill in the art that the embodiments disclosed herein may be practiced without these specific details.

Embodiments in accordance with the present disclosure generally relate to network security and monitoring and detecting system configuration changes. Cybersecurity threats pose a risk to systems and networks. Early detection or discovery of such threats can mitigate or reduce an amount of damage that such threats cause to one or more systems or a network to which the one or more system are coupled. Some cybersecurity threats can change a configuration of a system; for example, open a port on a system for an intruder when the port should be closed, which weakens the system and thus an overall network on which the system is employed.

Examples are presented herein for monitoring for system configuration changes and detection of unauthorized system configuration changes. In some examples, a network analyzer is described that can be coupled to a network to which a system can be coupled. The network analyzer can monitor network traffic with respect to the system to detect a system configuration change at the system. The network traffic analyzer can extract metadata from the network traffic (e.g., one or more packets), and analyze the extracted metadata to determine whether the system configuration change is an authorized system configuration change or an unauthorized system configuration change. The extracted metadata can characterize the system configuration change. In some examples, the network analyzer can employ a trained machine learning model for processing the metadata to determine a type of system configuration change. The network analyzer can process the determined system configuration change based on change management data, which can be provided by a change management system that can track and manage system configuration changes. The network analyzer can determine whether the system configuration change is authorized or unauthorized based on the processing. In some examples, the network analyzer can generate an unauthorized system configuration alert indicating that the system configuration change for the system is not an authorized or approved system configuration change. The alert can be provided to a user device to alert a user of the system configuration change.

Figure 1:
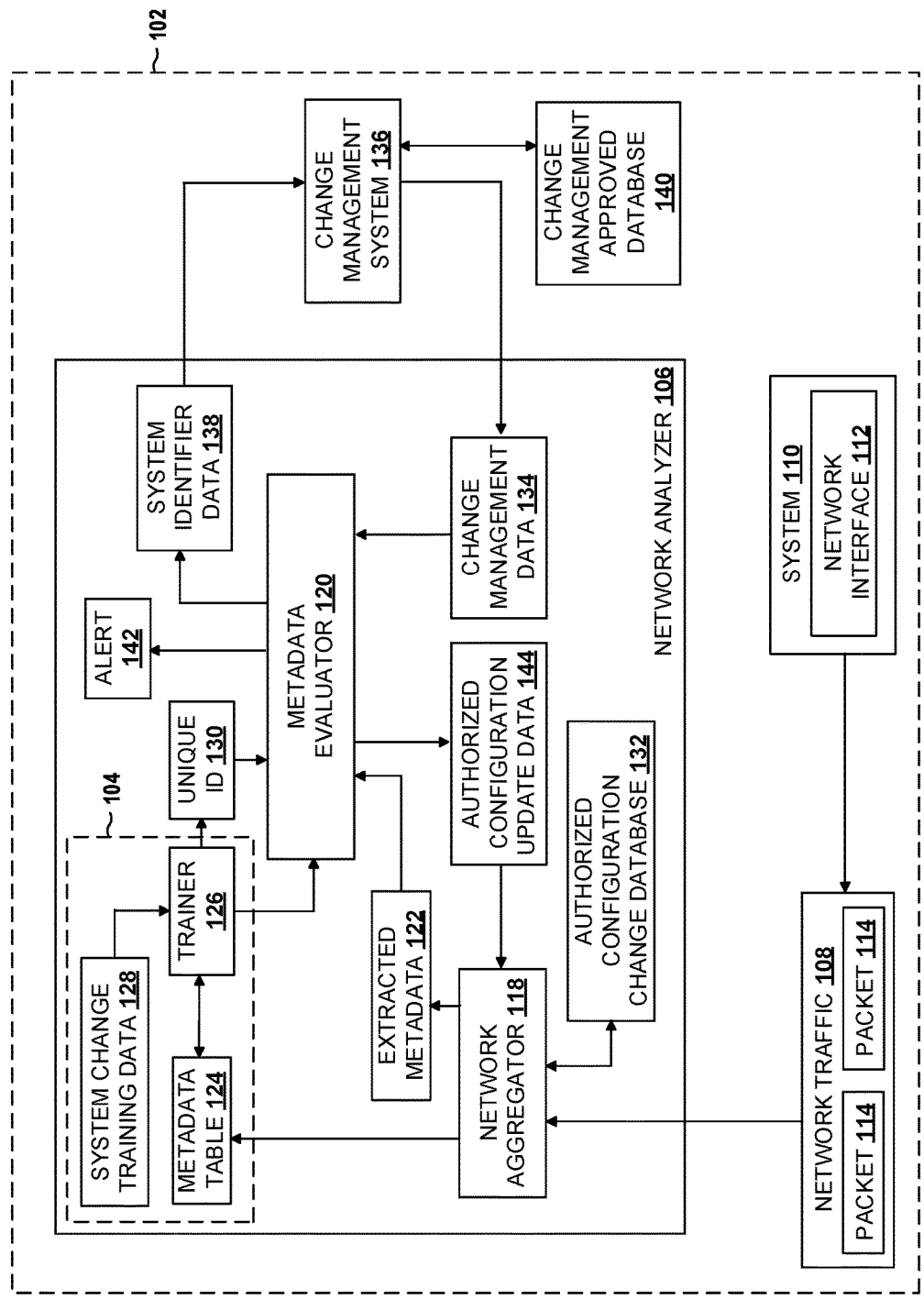
FIG. 1 is an example of a system for monitoring and detecting system configuration changes.
Figure 6:
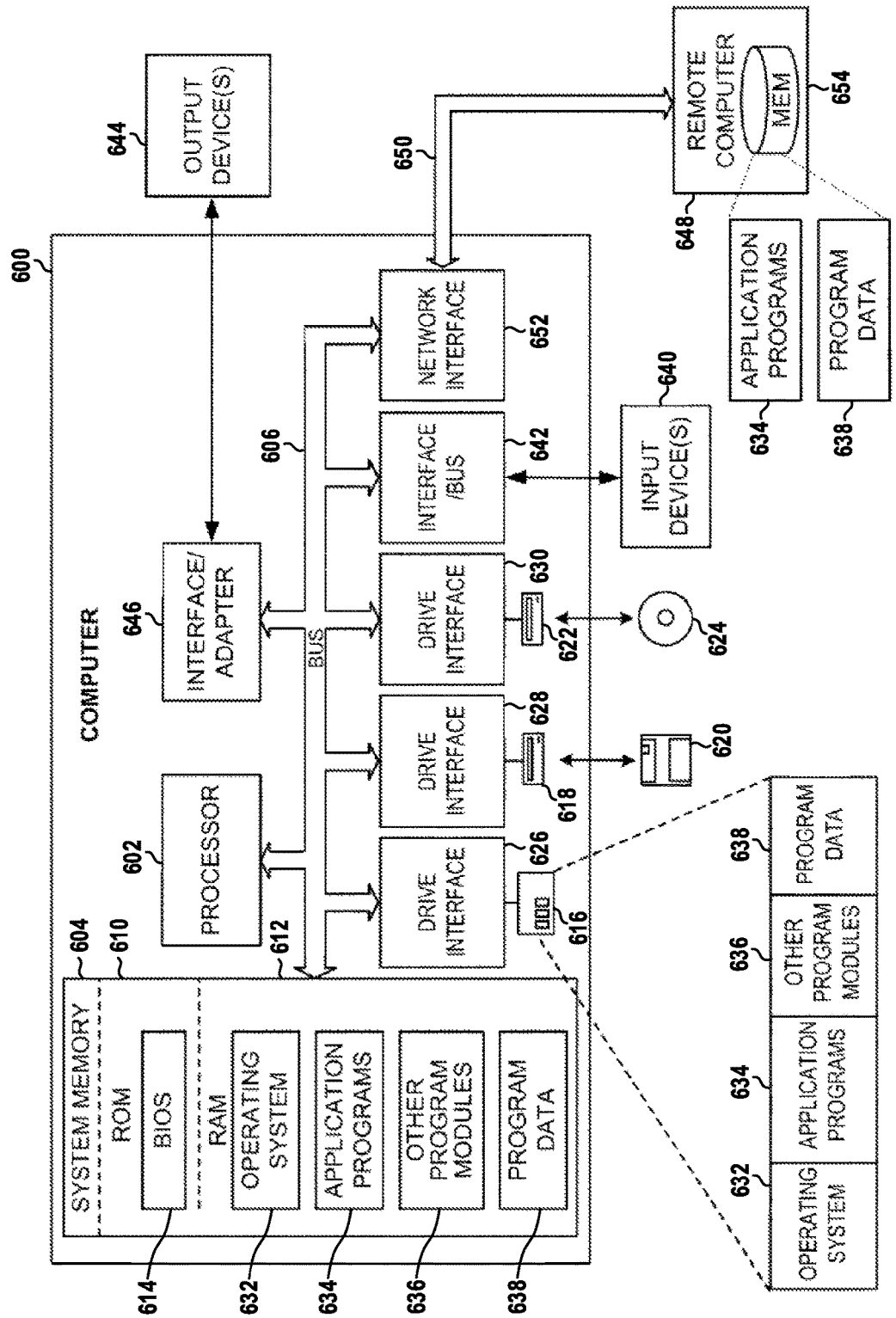
FIG. 6 depicts an example computing environment that can be used to perform methods according to an aspect of the present disclosure.

FIG. 1 is an example of a system 100 for monitoring and detecting configuration changes in a network 102 (e.g., a corporate network) of which system 100 may be a part. The configuration changes of concern may be to any hardware and/or software (for example application) asset of the network 102, or to any system therein, such as a system 110. For clarity and brevity the discussion herein focuses on configuration changes to a system 110, but it should be understood that the broader definition is intended. The system 100 includes a network analyzer 106. In some examples, the network analyzer 106 can be implemented using various modules shown in block form in the drawings. The modules can be in software or hardware form or a combination thereof. The modules can include a network analyzer 106 that can process network traffic 108 to detect a system configuration change, for example in the system 110 therein. In some examples the network analyzer 106 can be implemented as machine readable instructions that can be stored in memory (e.g., a memory 612, as shown in FIG. 6) and executed by a processor (e.g., a processor 602, as shown in FIG. 6). By way of example, the memory can be implemented, for example, as a non-transitory computer storage medium, such as volatile memory (e.g., random access memory (RAM), such as DRAM), non-volatile memory (e.g., a hard disk drive, a solid-state drive, a flash memory, or the like), or a combination thereof. The processor may be implemented, for example, as a processor core. The memory can store machine-readable instructions that can be retrieved and executed by the processor. As described herein, the network traffic 108 can be generated in the network 102; in other examples, it can be provided to the network analyzer 106 for stand-alone analysis of a network other than corporate network 102.

In some instances, a system 110 can include a network interface 112 for packetizing data into one or more packets 114 to provide the network traffic 108. In some examples, the one or more packets 114 are internet protocol (IP) packets. While examples are presented herein wherein the one or more packets 114 (corresponding to the network traffic 108) are presented as IP packets, in other examples, the one or more packets may be based on a different communication protocol. Because the system 110 is coupled to the network 102, the system 110 can be exposed to threats (e.g., malware, a hacker, and/or the like) that can originate internally on the network 102, or outside the network 102 (e.g., on the Internet). For example, a threat may modify or change a configuration of the system 110 to weaken the security and increase the attack surface of the system 110 and/or network 102. The configuration change may be manifested as data embodied within the one or more packets 114 on the network 102. The one or more packets 114 can include metadata that can characterize the system configuration change.

The term "system configuration change" and its derivatives as used herein can include any type of hardware and/or software change to a system (e.g., a node, assets, a device (e.g., computers, tablets, mobile phones, portable devices, I/O devices, such as network adapters, portable drives (e.g., flash drivers), display devices, input device, and/or the like), a server, an application, a program, a module, a cloud computing system, and/or the like) that has not been authorized on, coupled, and/or connected to a network (e.g., wired and/or wireless network) that modifies or changes the system, or an underlying functionality, operation, and/or purpose of the system. In some examples, system configuration changes can include alterations to information technology (IT) infrastructures, for example, changes to policies (e.g., system or software update, a setting or configuration change, a malware infection, and the like). In further or alternative examples, system configuration changes can include certificate changes, rule changes, logic changes, authentication data changes, database schemas changes, protocol schemas changes, and/or other schema changes. Thus, in some examples, a system configuration change can correspond to an unauthorized change that is made to an IT infrastructure that violates defined and agreed change policies.

By way of example, the configuration change can include a password change, a password type change (e.g., fewer characters, no special symbols, and/or the like), a system location change (e.g., that can impact or result in a software change corresponding to a system configuration change), a port change (e.g., closing or opening a port), communication on a port (e.g., that previously had no communication or was not authorized for communication), disabling or enabling a data collector, disabling a patch service (e.g., an auto patch service), removing administrator restrictions on a database, adding a new account (e.g., to an operating system (OS)), a firewall rule change, restarting an application server, and/or use of an administrator account after the account has been idle for a given amount of time. While the above are examples of different system configuration changes, in other examples, it is to be understood that other or additional system configuration changes can occur at the system 110 that can be detected and processed according to the examples herein.

In some examples, the system configuration change can be introduced by authorized personnel, such as an IT administrator or a user of the system 110, which can also cause the system 110 to transmit data within the one or more packets 114 on the network 102. As described herein, the network analyzer 106 can process the metadata associated with system configuration changes at the system 110 to detect whether the system configuration change is an authorized system configuration change (e.g., caused by IT personnel or the user of the system 110), or an unauthorized system configuration change (e.g., caused by the threat).

For example, the network analyzer 106 can include a network aggregator 118 to collect (e.g., aggregate) the network traffic 108 and extract the metadata therein characterizing the system configuration change for evaluation by a metadata evaluator 120 to determine whether the system 110 has been compromised. In some examples, the network traffic 108 may be intercepted (e.g., captured) by one or more network tools (e.g., hardware and/or software tools) and/or devices, such as TAPs, SPANs, which may be employed on the network 102 to monitor, diagnose, capture network traffic, log, and/or troubleshoot devices and/or servers. The one or more network tools and/or devices can provide the intercepted network traffic 108 to the network aggregator 118 or the network aggregator 118 can retrieve the intercepted traffic 108 from the one or more network tools and/or devices. The network aggregator 118 can process the network traffic 108 to extract the metadata to provide extracted metadata 120, as shown in FIG. 1.

In some examples, the network aggregator 118 can output a metadata table 124 based on received network traffic 108 that can be used by a machine learning engine 104 for training a machine-learning model, as described herein. For example, the network aggregator 118 can extract and categorize the metadata from the one or more packets 114 into metadata categories. The metadata categories can include authorized and unauthorized metadata categories. The machine-learning model as described herein can be trained based on the metadata categories. The categorized metadata can be stored in the memory as the metadata table 124. The stored metadata can be used for training the machine-learning model for classifying normal and abnormal metadata (corresponding to differentiating between authorized and unauthorized system configuration changes). Normal metadata can refer to metadata extracted from the network traffic 108 that is associated with an authorized system configuration change and abnormal metadata can refer to metadata that is associated with an unauthorized system configuration change in the network 102 and/or at the system 110 (or other systems). In some examples, the metadata evaluator 120 incorporates the machine-learning model that has been trained by a machine-learning algorithm associated with a trainer 126 of the machine learning engine 104. The trainer 126 can train the metadata evaluator 120 to differentiate between authorized and unauthorized system and network configuration changes, and thus determine a type of configuration change.

In some examples, the machine learning algorithm is a supervised machine learning classifier algorithm and thus the trainer 126 is a classifier algorithm and the metadata evaluator 120 is a classifier model. As an example, the supervised machine learning classifier algorithm can be a decision tree algorithm, such as a random forest algorithm. In other examples, the machine-learning algorithm can be implemented as a linear classifier algorithm (e.g., a logistic regression, a Naïve Bayes, and/or a Fisher's linear discriminant algorithm), a support vector machine algorithm (e.g., a least squares support vector machine algorithm), a quadratic classifier algorithm, a Kernel estimation algorithm (e.g., K-nearest neighbor algorithm), a neural network algorithm, or a learning vector quantization algorithm. In further examples, the machine-learning algorithm can be implemented as a non-supervised machine learning algorithm.

For example, the trainer 126 can train the metadata evaluator 120 based on the metadata table 124 and system change training data 128. The system change training data 128 can identify authorized and unauthorized system configuration changes for the system 110. Thus, system change training data 128 can identify different system configurations for the system 100 and whether each system configuration change is an authorized and unauthorized system configuration change for the system 110. In some examples, the system change training data 128 can include normal and abnormal metadata for system configuration changes. Normal metadata can correspond to metadata that characterizes an authorized system configuration change. In contrast, abnormal metadata can correspond to metadata that characterizes an unauthorized system configuration change.

In some examples, the trainer 126 can assign a unique identifier (ID) 130 to metadata within the one or more metadata categories of the metadata table 124. The unique ID 130 can be assigned by the trainer 126 in response to determining that the metadata in the metadata table 124 characterizes an unauthorized system configuration change for the system 110 to identify such data therein as abnormal metadata. The assignment by the trainer 126 can be based on the system change training data 128. In some instances, the trainer 126 can update the metadata table 124 with the unique ID 130 for metadata therein to identify such data therein as the abnormal metadata based on the system change training data 128. The unique ID 130 can be used during training of the metadata evaluator 120 to track abnormal metadata and thus unauthorized configuration changes in the corporate network 102 and/or a system 110. The trainer 126 can train the metadata evaluator 120 to provide a trained metadata evaluator based on the updated metadata table 124 and the system change training data 128. In some examples, the trainer 126 can extract from the metadata table 124 the abnormal metadata based on the unique ID 130 and train the metadata evaluator 120 based on the abnormal metadata to differentiate between different types of system configuration changes.

The metadata evaluator 120 once trained can determine whether the network traffic 108 contains normal or abnormal metadata corresponding to detecting authorized and unauthorized system configuration changes. For example, the network aggregator 118 can provide the extracted metadata 122 from the network traffic 108 (e.g., the one or more packets 114 therein) to the metadata evaluator 120. In some examples, the network aggregator 118 can aggregate the one or more packets 114 (e.g., for a given period of time and/or from different packet sources, such as the one or more network tools and/or devices) to provide the network traffic 108, which may be referred to as aggregated network traffic.

In some examples, the metadata evaluator 120 can evaluate the extracted metadata 122 relative to an authorized configuration change database 132 to determine whether the configuration change for the network 102/system 110 matches a previously approved system configuration change. The authorized configuration change database 132 can store previously authorized system configuration changes for the system 110 that have been identified by the metadata evaluator 120 as described herein. In some examples, the network aggregator 118 can evaluate metadata from one or more subsequent packets for a potential system configuration change for the system 110 according to the examples described herein in response to identifying the system configuration change for the system 110 in the authorized configuration change database. In some instances, the network aggregator 118 can provide the extracted metadata 122 to the metadata evaluator 120 for determining whether the system configuration change is an authorized system configuration change for the system 110 in response to determining that the authorized configuration change database 132 does not identify the system configuration change for the system 110.

The metadata evaluator 120 can process the extracted metadata 122 to detect a change in the system configuration in the system 100. The metadata evaluator 120 can determine a type of system configuration change based on the extracted metadata 122. The metadata evaluator 120 can determine whether the system configuration change for the system 110 is an authorized system configuration change based on change management data 134. For example, the metadata evaluator 120 can communicate with a change management system 136 (e.g., implemented on a device, such as a computer, a server, and/or a cloud environment). While the example of FIG. 1 illustrates the system 100 including the change management system 136 in other examples the change management system 136 can be external to the system 100, and in some instances, located on different device and/or network.

The metadata evaluator 120 can provide system identifier data 138 for the system 110. In some examples, the system identifier data 138 can correspond to an IP address for the system 110. In some examples, the metadata evaluator 120 can receive the network traffic 108 and extract the system identifier 138 from the one or more packets 114. Thus, the system identifier data 138 can be associated with the one or more packets 114 from which the metadata was extracted. In some examples, the metadata evaluator 120 can communicate with the network aggregator 118, which can extract and provide the system identifier data 138 for the system 110 to the metadata evaluator 120 or to the change management system 136. In some instances, the metadata evaluator 120 can also be programmed to provide the extracted metadata 122 and/or data identifying the system configuration change for the system 110 to the change management system 136.

The change management system 136 can provide change management data 134 based on the system identifier data 138 (e.g., the IP address) and the extracted data 122 and/or data identifying the system configuration change for the system 110. The system identifier data 138 can be used by the change management system 136 to evaluate a change management approved database 140 to identify system configuration data for the system 110. For example, the change management approved database 140 can identify all devices and/or assets that communicate through the network 102, respective approved system configurations, and respective network location information (e.g., IP addresses). The change management database 140 can store and identify different approved system configuration changes for the system 100. In some examples, the system change training data 128 can be provided based on the change management database 140. By way of further example, the approved system configuration change can be set based on user input in the change management database 140. While the example of FIG. 1 illustrates the change management approved database 140 as separate from the change management system 136 in some examples the change management system 136 includes the change management approved database 140. In some examples, the change management system 136 corresponds to the change management approved database 140. The change management system 136 can evaluate the identified system configuration data relative to the extracted metadata 122 and/or data identifying the system configuration change for the system 110 to determine whether the system configuration change is valid (e.g., an authorized system configuration change) to provide the change management data 134. In some examples, the metadata evaluator 120 can query the change management approved database 140 to retrieve the change management data 134 based on the system identifier data 138 and the extracted metadata 122 and/or data identifying the system configuration change for the system 110.

In some examples, the metadata evaluator 120 can generate an unauthorized system configuration alert 142 based on the change management data 134 indicating that the system configuration change is not an approved system configuration change. The alert 142 can be provided to a user, such as a user device (e.g., a computer, a tablet, a mobile phone, and/or the like) used by IT personnel or a user. The IT personnel or the user can investigate the unapproved system configuration change to ascertain whether the change was caused by the threat (e.g., malware, or an unauthorized user). In some examples, the metadata evaluator 120 can generate authorized configuration update data 144 based on the change management data 134 indicating that the system configuration change is an approved system configuration change. The authorized configuration update data 144 can be provided to the network aggregator 118.

The network aggregator 118 can update the authorized configuration change database 132 based on the authorized configuration update data 144 to provide an updated authorized configuration change database, such that the network aggregator 118 can determine that a similar system configuration change in a future is an authorized system configuration change. The network aggregator 118 can evaluate metadata from the one or more subsequent packets of the network traffic 108 for a potential system configuration change according to the examples described herein in response to updating the authorized configuration change database 132. In some examples, the metadata evaluator 120 can update the authorized configuration change database 132 based on the authorized configuration update data 144.

Accordingly, by employing the network analyzer 106, the system 110 can be monitored for unauthorized system configuration changes. The network analyzer 106 can identify and differentiate different types of metadata that are associated with authorized and unauthorized system configuration changes at the system 100 to mitigate security risks that such changes pose to the system 110 and in some instances users of the system 110 and/or the network 102. The network analyzer 106 can alert appropriate personnel if abnormal traffic is discovered (e.g., based on the extracted metadata 122) such that appropriate measures and/or actions can be taken to mitigate the threat. In some instances, the network analyzer 106 can process the network traffic 108 intercepted by the one or more network tools and/or devices, for example, as described herein, that may be generated by malware, a botnet, a Trojan virus, and/or the like. In some instances, the network analyzer 106 can detect suspicious application behavior based on the network traffic 108. Moreover, because the network analyzer 106 uses metadata from the network traffic 108 the IT personnel or the user can efficiently and/or effectively quarantine the threat from spreading to other portions of the network 102. Furthermore, the network analyzer 106 can be integrated into a change management solution (e.g., implemented as the change management system 136, as shown in FIG. 1), which manages all configuration changes and has a list of all devices and/or assets that communicate through the network 102.

Figure 2:
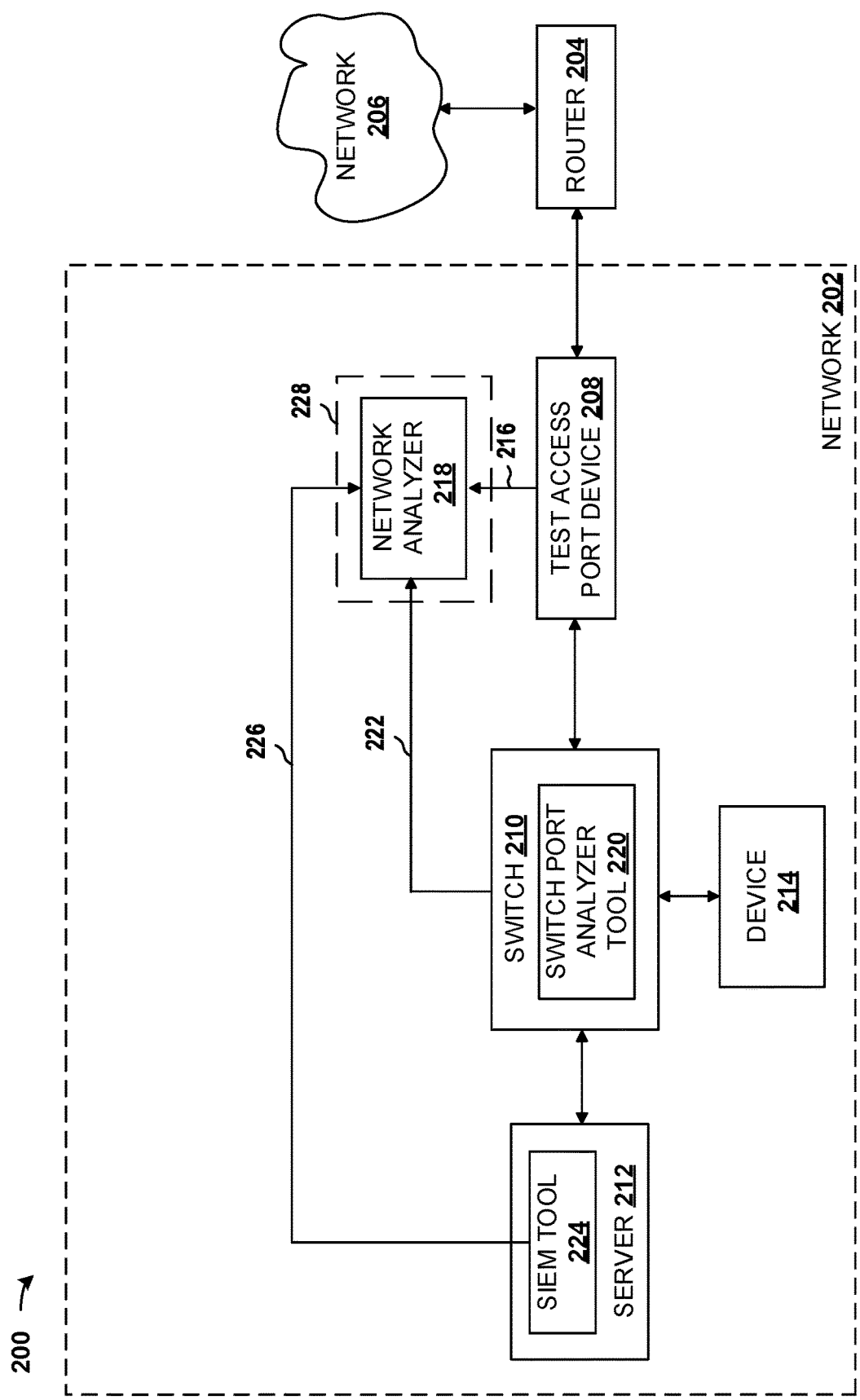
FIG. 2 is an example of a communication system.

FIG. 2 is an example of a communications topology 200 for supplying network traffic such as that monitored in system 100 above, and includes a network 202 and a network 206. In some examples, the network 202 can be implemented as a local area network (LAN), which can communicate via a router 204, with devices and/or services implemented as part of the network 206. For example, the LAN can be employed at an entity (e.g., in a corporate setting, hospital setting, etc.) or a personal establishment (e.g., a home network). While the example of FIG. 2 illustrates the router 204 outside the network 202, in other examples, the network 202 can include the router 204. In some instances, the router 204 includes a firewall (e.g., a network security application).

By way of further example, the network 202 and/or 206 can include one or more wired and/or wireless networks, including, but not limited to: a cellular network, a wide area network ("WAN"), a local area network ("LAN"), a combination thereof, and/or the like. One or more wireless technologies that can be included within the network 202 and/or 206 can include, but are not limited to: wireless fidelity ("Wi-Fi"), a WiMAX network, a wireless LAN ("WLAN") network, BLUETOOTH® technology, a combination thereof, and/or the like. For instance, the network 202 and/or 206 can include the Internet and/or the Internet of Things ("IoT"). In various examples, the network 202 and/or 206 can include one or more transmission lines (e.g., copper, optical, or wireless transmission lines), routers, gateway computers, and/or servers, such as described herein. Further, devices coupled to the network 202 and/or 206 can include one or more network adapters and/or interfaces (not shown) to facilitate communications via the network 202 and/or 206.

In some examples, the network 202 includes a TAP device 208. The TAP device 208 can be coupled between the router 204 and a switch 210. The TAP device 208 can be configured to capture (e.g., intercept) network traffic (e.g., as one or more packets) on the network 202. In some examples, the network traffic can correspond to the network traffic 108, as shown in FIG. 1. Thus, reference can be made to the example of FIG. 1 in the example of FIG. 2. For example, packets originating at one or more devices, for example, a server 212 and/or device 214, can be captured by the TAP device 208. The TAP device 208 can also capture packets destined for the server 212 and/or the device 214. The network traffic captured by the TAP device 208 can be provided as captured network traffic 216 to a network analyzer 218. In some examples, the network analyzer 218 can be implemented similar to the network analyzer 106, as shown in FIG. 1.

In some examples, the switch 210 is a SPAN-enabled switch that includes a SPAN tool 220. The switch 210 can include a dedicated port (not shown) that the SPAN tool 220 can use to receive a mirrored copy of the network traffic on the network 202. The mirrored copy of the network can be provided as captured network traffic 222 to the network analyzer 218. In further or alternative examples, the server 212 can include a SIEM tool 224. While the SIEM tool 224 is illustrated in the example of FIG. 2 as being implemented on the server 212, in other examples, the SIEM tool 224 can be implemented on a different device and/or server. The SIEM tool 224 can capture network traffic on the network 202 to provide captured network traffic 226. The SIEM tool 224 can provide the captured network traffic 226 to the network analyzer 218, as shown in FIG. 2. The captured network traffic 216, 222, and 224 can be provided to a device or server 228 (e.g., which can be configured similar to the server 212 or the device 214) that can be coupled to the network 202. In some examples, the captured network traffic 216, 222, and/or 224 corresponds to the network traffic 108, as shown in FIG. 1. The network analyzer 218 can be representative of machine-readable instructions that can be executed on the device or server 226 to implement at least some of the functionality as described herein with respect to FIG. 1. Thus, in some examples, the system 100 can be implemented on the device or server 226.

The network analyzer 218 can be used on the network 202 to monitor for unwanted intrusions into the network 202, such as by a hacker, an intruder, and/or malware. Some intrusions into the network 202 may result in a system configuration change. For example, the intruder can gain access to the device 214 and can open a port that was previously closed to provide a back entry access to the intruder. Because the network 202 is configured with the network analyzer 218, the network analyzer 218 can detect the system configuration change at the device 214 and alert a user (e.g., a network administrator) of the unauthorized system configuration change. By configuring the network analyzer 218 on the network 202, the network analyzer 218 minimizes (e.g., eliminates or reduces) threats posed to the network 202, nodes and/or devices on the network 202 from unwanted actors.

Figure 3:
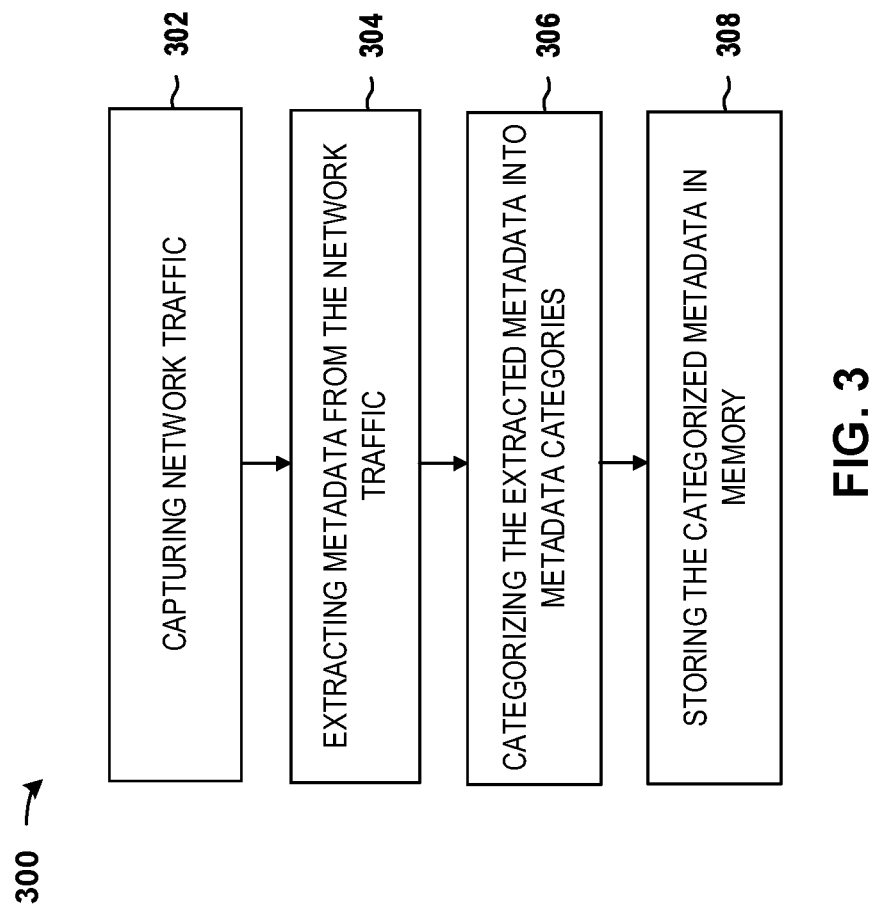
FIG. 3 is an example of a method for generating metadata for training a metadata evaluator.
Figure 4:
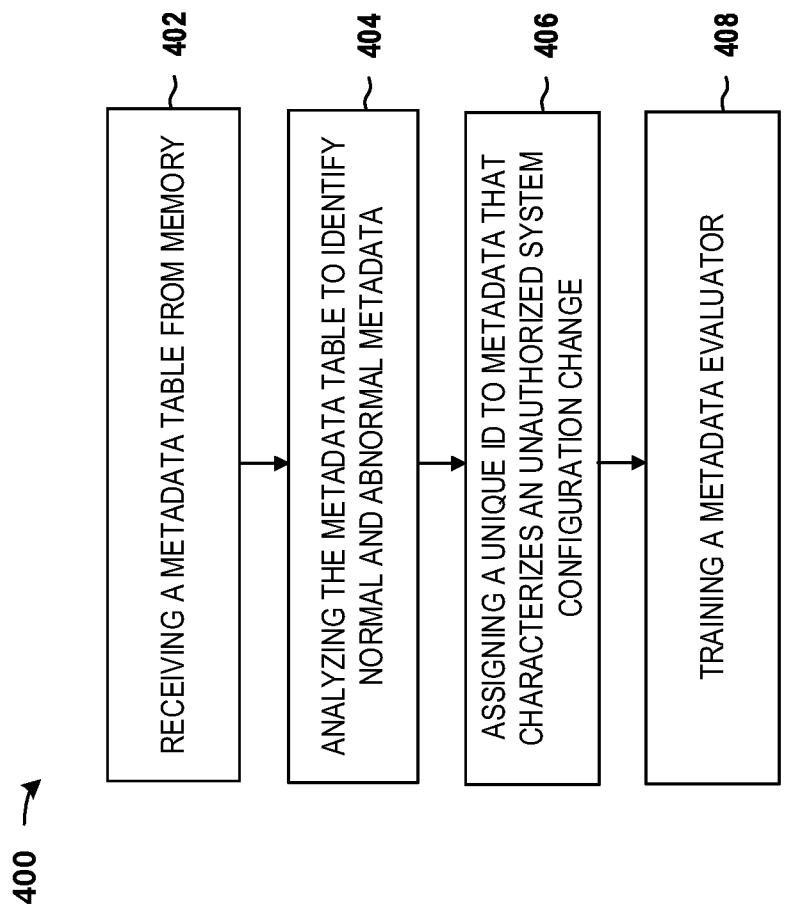
FIG. 4 is an example of a method for training a metadata evaluator.
Figure 5:
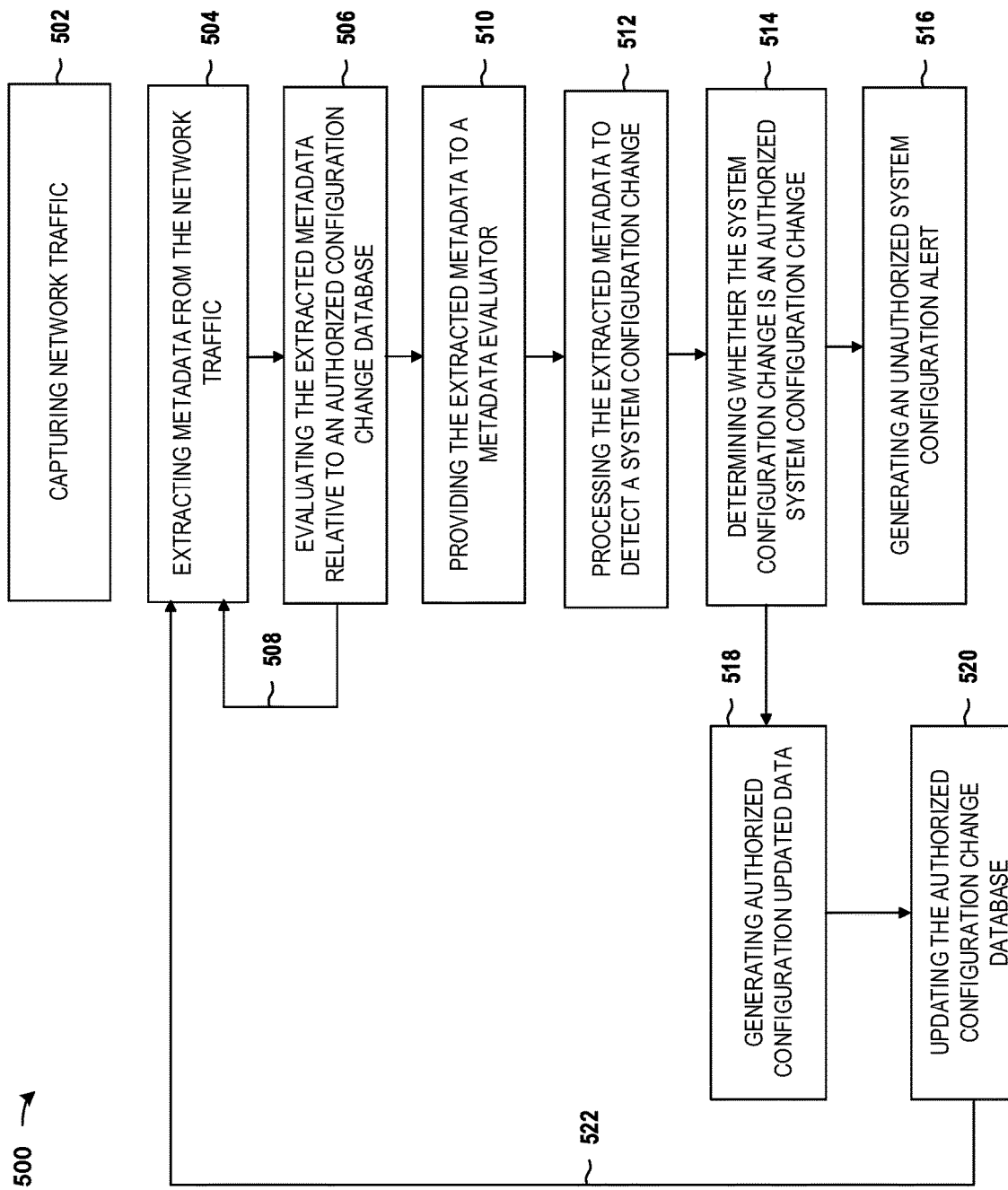
FIG. 5 is an example of a method for detecting a system configuration.

In view of the foregoing structural and functional features described above, example methods will be better appreciated with reference to FIGS. 3-5. While, for purposes of simplicity of explanation, the example methods of FIGS. 3-5 are shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement the methods.

FIG. 3 is an example of a method 300 for generating metadata for training a metadata evaluator (the metadata evaluator 120, as shown in FIG. 1). The method 300 can be implemented by the network aggregator 118, as shown in FIG. 1. Thus, reference can be made to the example of FIGS. 1-2 in the example of FIG. 3. The method 300 can begin at 302 by collecting (e.g., capturing, retrieving, or the like) network traffic (e.g., the network traffic 108, as shown in FIG. 1). In some examples, step 302 includes aggregating the network traffic on an internal network (e.g., the network 202, as shown in FIG. 1) from one or more network tools and/or devices (e.g., the TAP device 208, the SPAN 220, and/or the switch SIEM tool 224 as shown in FIG. 2). The network traffic can include one or more packets (e.g., the one or more packets 114, as shown in FIG. 1) that include metadata. At 304, extracting the metadata from the network traffic. At 306, categorizing the extracted metadata into metadata categories. At 308, storing the categorized metadata in memory. In some examples, step 308 includes storing a metadata table (e.g., the metadata table 124, as shown in FIG. 1) in the memory based on the metadata categories. As described herein, the stored metadata table can be used for training a metadata evaluator (e.g., the metadata evaluator 120, as shown in FIG. 1) for differentiating between different types of system configuration changes at a system (e.g., the system 110, as shown in FIG. 1). While examples are described herein wherein the categorized metadata is stored in a table format, in other examples, a different data arrangement format may be used.

In this regard, FIG. 4 is an example of a method 400 for training a metadata evaluator, such as the metadata evaluator 120, as shown in FIG. 1. The method 400 can be implemented by the trainer 126, as shown in FIG. 1. Thus, reference can be made to the example of FIGS. 1-3 in the example of FIG. 4. The method 400 can begin at 402 by receiving or retrieving a metadata table (e.g., the metadata table 124, as shown in FIG. 1) associated with collected network traffic (e.g., the network traffic 108, as shown in FIG. 1). At 404, analyzing the metadata table to determine whether metadata associated with one or more metadata categories in the metadata table for captured network traffic is to be identified as normal metadata or abnormal metadata based on system change training data (e.g., the system change training data 128, as shown in FIG. 1).

In some examples, step 404 can be implemented based on user input at a user device to determine whether metadata within the one or more metadata categories of the categorized metadata is to be identified as normal or abnormal metadata. In some instances, step 404 can include updating the metadata table with information identifying therein the metadata as normal and abnormal. At 406, assigning a unique ID to the metadata of the metadata table that characterizes an unauthorized system configuration change for a system (e.g., the system 110, as shown in FIG. 1) to identify the metadata therein as the abnormal metadata. In some instances, step 406 can include updating the metadata table with the unique ID identify such data therein as the abnormal metadata. At 408, training the metadata evaluator to provide a trained metadata evaluator based on the updated metadata table. In some examples, the step 408 can include extracting from the metadata table the abnormal metadata based on the unique ID and normal metadata, and training the metadata evaluator based on the extracted metadata and respective unique IDs.

FIG. 5 is an example of a method 500 for determining whether a system configuration change is an authorized system change for a system (e.g., the system 110, as shown in FIG. 1) on a network (e.g., the network 102, as shown in FIG. 1). The method 500 can be implemented by the network analyzer 114, as shown in FIG. 1. Thus, reference can be made to the example of FIGS. 1-4 in the example of FIG. 5. The method 500 can begin at 502 by receiving, capturing or intercepting (e.g., using the network aggregator 118, as shown in FIG. 1) network traffic (e.g., the network traffic 108, as shown in FIG. 1) for the system. In some examples, the step 502 can include aggregating the network traffic (e.g., the network traffic 216, 222, and/or 226, as shown in FIG. 1) captured by one or more network tools and/or devices as described herein to provide aggregated network traffic.

At 504, extracting (e.g., using the network aggregator 118, as shown in FIG. 1) metadata from the network traffic (e.g., the one or more packets 114, as shown in FIG. 1) or the aggregated network traffic to provide extracted metadata (e.g., the extracted metadata 112, as shown in FIG. 1). The extracted metadata can characterize a system configuration change for the system on the network. At 506, evaluating the extracted metadata relative to an authorized configuration change database (e.g., the authorized configuration change database 132, as shown in FIG. 1) to determine whether the system configuration change for the system matches a respective previously approved system configuration change for the system by a metadata evaluator (e.g., the metadata evaluator 120, as shown in FIG. 1). In some examples, at 508, evaluating metadata from one or more subsequent packets for a potential system configuration change according to the examples described herein in response to identifying the system configuration change for the system in the authorized configuration change database. In some examples, at 510, providing the extracted metadata to the metadata evaluator for evaluating the system configuration change in response to not identifying the system configuration change in the authorized configuration change database. At 512, processing the extracted metadata (e.g., using the metadata evaluator 120, as shown in FIG. 1) to detect a change in the system configuration and thus detect a type of system configuration change. At 514, determining (e.g., using the metadata evaluator 120, as shown in FIG. 1) whether the system configuration change is an authorized system configuration change based on change management data (e.g., the change management data 134, as shown in FIG. 1). The change management data can be provided by the change management system 136, as shown in FIG. 1)

In some examples, at 516, generating an unauthorized system configuration alert (e.g., the alert 142, as shown in FIG. 1) based on the change management data indicating that the system configuration change is not an authorized system configuration change. The alert can be provided to a user, such as a user device (e.g., a computer, a tablet, a mobile phone, and/or the like). The network personnel can investigate the unauthorized system configuration change to ascertain whether the change was caused by an unauthorized actor (e.g., a hacker, malware, and/or the like). In some examples, at 518, generating authorized configuration update data (e.g., the authorized configuration update data 144, as shown in FIG. 1) based on the change management data indicating that the system configuration change is an approved system configuration change. At 520, updating the authorized configuration change database to provide an updated authorized configuration change database, such that the network aggregator can determine that a similar system configuration change in a future is an authorized system configuration change. At 522, evaluating metadata from the one or more subsequent packets for a potential system configuration change according to the examples described herein in response to updating the authorized configuration change database.

In view of the foregoing structural and functional description, those skilled in the art will appreciate that portions of the embodiments described herein may be implemented as a method, data processing system, or computer program product. Accordingly, these portions of the present disclosure may take the form of an entirely hardware embodiment, an entirely software embodiment, or an embodiment combining software and hardware. Furthermore, portions of the embodiments herein may be a computer program product on a computer-usable storage medium having computer readable program code on the medium. Any suitable computer-readable medium may be utilized including, but not limited to, static and dynamic storage devices, hard disks, optical storage devices, and magnetic storage devices.

Certain embodiments described herein have also been described herein with reference to block illustrations of methods, systems, and computer program products. It will be understood that blocks of the illustrations, and combinations of blocks in the illustrations, can be implemented by computer-executable instructions. These computer-executable instructions may be provided to one or more processor of a general purpose computer, special purpose computer, or other programmable data processing apparatus (or a combination of devices and circuits) to produce a machine, such that the instructions, which execute via the processor, implement the functions specified in the block or blocks. These computer-executable instructions may also be stored in computer-readable memory that can direct a computer or other programmable data processing apparatus to function in a particular manner, such that the instructions stored in the computer-readable memory result in an article of manufacture including instructions which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

In this regard, FIG. 6 illustrates one example of a computer system 600 that can be employed to execute one or more embodiments of the present disclosure, such as including generating metadata (e.g., the metadata table 124, as shown in FIG. 1) for training a metadata evaluator (the metadata evaluator 120, as shown in FIG. 1), training of the metadata evaluator, and/or determining whether a system configuration change is an authorized system change for a system (e.g., the system 110, as shown in FIG. 1). Computer system 600 can be implemented on one or more general purpose networked computer systems, embedded computer systems, routers, switches, server devices, client devices, various intermediate devices/nodes or stand alone computer systems. Additionally, computer system 600 can be implemented on various mobile clients such as, for example, a personal digital assistant (PDA), laptop computer, pager, and the like, provided it includes sufficient processing capabilities.

Computer system 600 includes processing unit 602, system memory 604, and system bus 606 that couples various system components, including the system memory 604, to processing unit 602. Dual microprocessors and other multi-processor architectures also can be used as processing unit 602. System bus 606 may be any of several types of bus structure including a memory bus or memory controller, a peripheral bus, and a local bus using any of a variety of bus architectures. System memory 604 includes read only memory (ROM) 610 and RAM 612. A basic input/output system (BIOS) 614 can reside in ROM 610 containing the basic routines that help to transfer information among elements within computer system 600.

Computer system 600 can include a hard disk drive 616, magnetic disk drive 618, e.g., to read from or write to removable disk 620, and an optical disk drive 622, e.g., for reading CD-ROM disk 624 or to read from or write to other optical media. Hard disk drive 616, magnetic disk drive 618, and optical disk drive 622 are connected to system bus 606 by a hard disk drive interface 626, a magnetic disk drive interface 628, and an optical drive interface 630, respectively. The drives and associated computer-readable media provide nonvolatile storage of data, data structures, and computer-executable instructions for computer system 600. Although the description of computer-readable media above refers to a hard disk, a removable magnetic disk and a CD, other types of media that are readable by a computer, such as magnetic cassettes, flash memory cards, digital video disks and the like, in a variety of forms, may also be used in the operating environment; further, any such media may contain computer-executable instructions for implementing one or more parts of embodiments shown and described herein.

A number of program modules may be stored in drives and RAM 610, including operating system 632, one or more application programs 634, other program modules 636, and program data 638. The application programs 634 and program data 638 can include functions and methods such as shown and described herein. In some examples, the one or more application programs 634 can include the network analyzer 106 of FIG. 1 or the network analyzer 218 of FIG. 2, as shown and described herein. A user may enter commands and information into computer system 600 through one or more input devices 640, such as a pointing device (e.g., a mouse, touch screen), keyboard, microphone, joystick, game pad, scanner, and the like. For instance, the user can employ input device 640 to edit or modify a change management system (e.g., the change management system 136, as shown in FIG. 1) and/or a change management approved database (e.g., the change management approved database 140, as shown in FIG. 1). These and other input devices 640 are often connected to processing unit 602 through a corresponding port interface 642 that is coupled to the system bus, but may be connected by other interfaces, such as a parallel port, serial port, or universal serial bus (USB). One or more output devices 644 (e.g., display, a monitor, printer, projector, or other type of displaying device) is also connected to system bus 606 via interface 646, such as a video adapter.

Computer system 600 may operate in a networked environment using logical connections to one or more remote computers, such as remote computer 648. Remote computer 648 may be a workstation, computer system, router, peer device, or other common network node, and typically includes many or all the elements described relative to computer system 600. The logical connections, schematically indicated at 650, can include a local area network (LAN) and a wide area network (WAN). When used in a LAN networking environment, computer system 600 can be connected to the local network through a network interface or adapter 652. When used in a WAN networking environment, computer system 600 can include a modem, or can be connected to a communications server on the LAN. The modem, which may be internal or external, can be connected to system bus 606 via an appropriate port interface. In a networked environment, application programs 634 or program data 638 depicted relative to computer system 300, or portions thereof, may be stored in a remote memory storage device 654.

The terminology used herein is for the purpose of describing particular embodiments only and is not intended to limit this disclosure. As used herein, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof. Also, the phraseology and terminology used herein is for the purpose of description and should not be regarded as limiting. The use of "including," "comprising," "having," "containing," "involving," and variations thereof herein, is meant to encompass items listed thereafter and equivalents thereof as well as additional items.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. While the present disclosure has been described with respect to a limited number of embodiments, those skilled in the art, having benefit of this disclosure, will appreciate that other embodiments may be devised which do not depart from the scope of the disclosure as described herein.

The invention claimed is:

1. A method, comprising:
receiving, using a network aggregator, network traffic for a system on a network;
extracting, using the network aggregator, metadata from the network traffic, the metadata being for a system configuration change of the system;
evaluating, using the network aggregator, the metadata relative to a configuration change database to determine whether the system configuration change is an authorized system configuration change based on the metadata;
providing, using the network aggregator, the metadata to a metadata evaluator in response to determining that the system configuration change is not an authorized system configuration change based on the configuration change database;
determining, using a machine learning (ML) model of the metadata evaluator, whether the system configuration change is an authorized system configuration change in response to receiving the metadata, the ML model being trained based on a metadata table and system change data, the metadata table comprising metadata categories for previously received metadata extracted from the network traffic, the metadata categories including authorized and unauthorized metadata categories that are assigned to respective metadata extracted from the network traffic, the system change data identifying authorized and unauthorized system configuration changes for the system; and causing, using the metadata evaluator, the configuration change database to be updated with the system configuration change in response to the ML model determining that the system configuration change is an authorized system configuration change so that similar future system configuration changes for the system or a different system are authorized by the network aggregator using the configuration change database.

2. The method of claim 1, wherein the network traffic includes one or more packets that include the metadata and the metadata is first metadata, and further comprising evaluating second metadata from one or more subsequent packets from the network traffic for another system configuration change for the-different system on the network to determine whether the other system configuration change is an authorized system configuration change based on the configuration change database.

3. The method of claim 1, wherein the ML model of the metadata evaluator determines whether the system configuration change is an authorized system configuration change based on change management data, and wherein the change management data indicates whether the system configuration change is an authorized or an unauthorized system configuration change.

4. The method of claim 3, further comprising:
communicating, using the metadata evaluator, an Internet Protocol (IP) address associated with one or more packets from which the metadata was extracted, and the metadata to a change management system, the metadata evaluator being implemented on a first device and the change management system being implemented on a second device; and receiving the change management data based on the IP address and the metadata, the change management data being generated by the change management system.

5. The method of claim 4, wherein the change management system:
identifies system configuration change data in a change management approved database using the IP address; and evaluates the identified system configuration data relative to the metadata to determine whether the system configuration change is an authorized or an unauthorized system configuration change.

6. The method of claim 3, further comprising generating an unauthorized system configuration alert based on the change management data indicating that the system configuration change is an unauthorized system configuration change, wherein the unauthorized system configuration alert is transmitted to a computer, a tablet, and/or a mobile phone and rendered on a display of the computer, the table and/or the mobile phone.

7. The method of claim 3, further comprising:
capturing the network traffic using a test access port (TAP) device on the network; and providing, using the TAP device, the captured network traffic to a switch port analyzer (SPAN) switch on the network; and providing, using the SPAN switch, the captured network traffic to a device on the network on which a network analyzer comprising the network aggregator and the metadata evaluator is being executed.

8. The method of claim 1, wherein the system configuration change is a hardware change.

9. A system comprising:
memory to store machine-readable instructions;
one or more processors to access the memory and execute the machine-readable instructions, the machine-readable instructions implementing a network analyzer comprising:
a network aggregator configured to:
aggregate network traffic to provide aggregated network traffic, and extract metadata from the aggregated network traffic, the metadata being for a system configuration change of the system;
evaluate the metadata relative to a configuration change database to determine whether the system configuration change is an authorized system configuration change based on the metadata;
provide the metadata to a metadata evaluator in response to determining that the system configuration change is not an authorized system configuration change based on the configuration change database; and
a metadata evaluator configured to:
determine, using a trained machine learning (ML) model, whether the system configuration change is an authorized system configuration change in response to receiving the metadata and based on change management data from a change management system, the ML model being trained based on a metadata table and system change data, the metadata table comprising metadata categories for previously received metadata extracted from the network traffic, the metadata categories including authorized and unauthorized metadata categories that are assigned to respective metadata extracted from the network traffic, the system change data identifying authorized and unauthorized system configuration changes for the system; and
cause the configuration change database to be updated with the system configuration change in response to determining that the system configuration change is an authorized system configuration change so that similar future system configuration changes for the system or a different system are authorized by the network aggregator using the configuration change database.

10. The system of claim 9, wherein the machine-readable instructions further comprise a trainer corresponding to a ML algorithm programmed to train a ML-model based on system change training data and a metadata table to provide the trained ML model.

* * * * *